United States Patent [19]

Appleberry

[11] Patent Number: 5,131,511
[45] Date of Patent: Jul. 21, 1992

[54] POTENTIAL ENERGY OR WEIGHT-OPERATED WHEEL BRAKES

[75] Inventor: Walter T. Appleberry, Long Beach, Calif.

[73] Assignee: Rockwell International Corporation, Seal Beach, Calif.

[21] Appl. No.: 527,919

[22] Filed: May 24, 1990

[51] Int. Cl.⁵ .............................................. B60T 13/04
[52] U.S. Cl. .................................. 188/176; 188/71.4; 188/72.6; 188/72.9; 244/111
[58] Field of Search .............. 188/174, 176, 195, 71.1, 188/71.3, 71.4, 71.5, 18 A, 72.6, 58, 59, 110, 140 R, 141, 114, 119, 129, 139, 72.9; 244/111, 110 R, 110 A, 103 R; 303/22.1

[56] References Cited

U.S. PATENT DOCUMENTS

| | | | |
|---|---|---|---|
| 1,711,602 | 5/1929 | Kindler | 188/72.9 |
| 1,857,888 | 5/1932 | Stout | 244/111 X |
| 2,174,398 | 9/1939 | Farmer | 188/72.6 X |
| 2,764,372 | 9/1956 | Baird et al. | 244/111 |
| 2,777,546 | 1/1957 | Kelley | 188/176 |
| 2,824,713 | 2/1958 | Kelley | 188/176 X |
| 2,953,221 | 9/1960 | Lucien | 188/72.9 |
| 3,342,290 | 9/1967 | Klaue | 188/71.4 |
| 4,213,519 | 7/1980 | Moser et al. | 188/71.4 |
| 4,351,423 | 9/1982 | Rogier | 188/72.3 X |
| 4,422,533 | 12/1983 | Price | 188/72.6 |
| 4,659,040 | 4/1987 | Sinclair | 244/111 X |
| 4,736,820 | 4/1988 | Price et al. | 188/72.6 X |

OTHER PUBLICATIONS

Catalog, Third Edition, Space Ordnance Systems, Ordnance Product Drawings and Data Sheets.
THK LM System Catalog, No. 100-1AE, THK Co., Ltd.

*Primary Examiner*—Douglas C. Butler
*Attorney, Agent, or Firm*—Lawrence N. Ginsberg; Charles T. Silberberg

[57] ABSTRACT

A braking device for a vehicle utilizing a plurality of wheels that permit motion relative to a substantially horizontal surface. A support is provided for supporting at least one of the wheels. An orthogonal coordinate system is defined where x is the longitudinal axis of the vehicle and is parallel to the direction of vehicle motion; y is perpendicular to the x-axis, and in the horizontal plane, and z is the vertical axis. The support includes an axle disposed substantially parallel to the y-axis for supporting at least one wheel. A device is provided for rotatably engaging the axle with the wheel. The supports includes a rotary friction brake assembly and an attachment for pivotally attaching the stator of the brake assembly to the main structure. The attachment includes at least one link element disposed substantially in the y-z plane. The link element has a first end pivotally mounted to the main structure and a stator attaching portion pivotally mounted to the stator. A restraint/release device is connected to the link element for securing the link element in a desired angular position so as to preclude braking by preventing sliding of the stator along the axle. The restraint/release device when released, allows the link element to pivot so as to allow sliding of the stator along the axle, bringing the stator and rotor together, thereby providing braking.

28 Claims, 3 Drawing Sheets

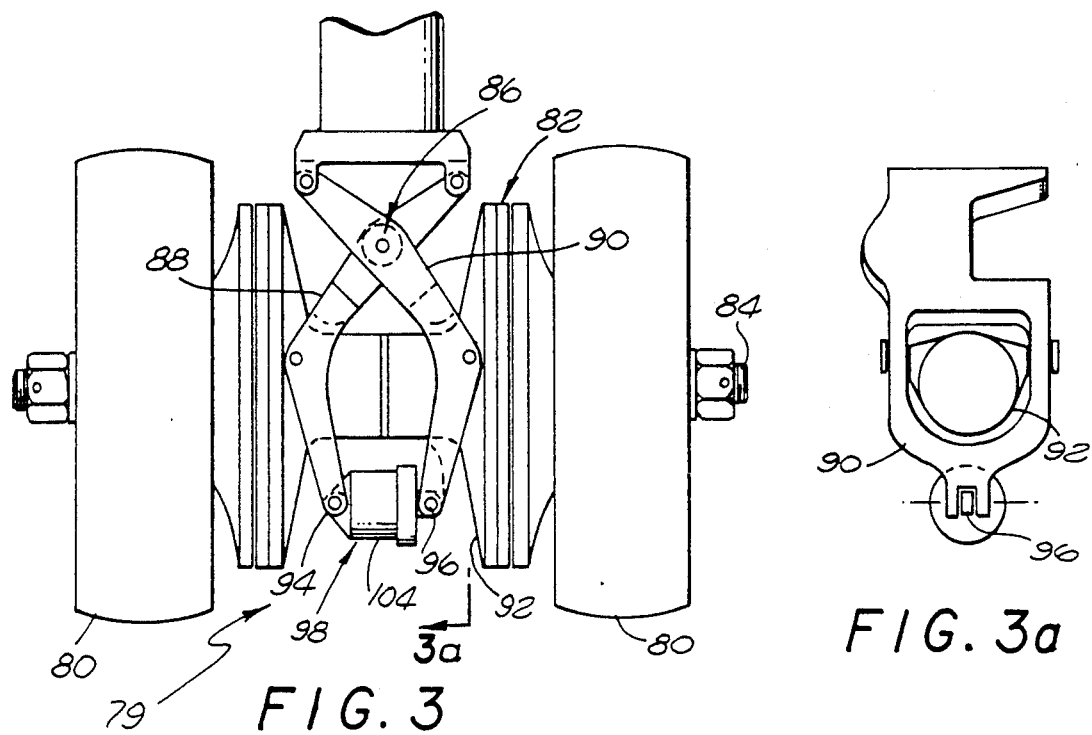
FIG. 3
FIG. 3a
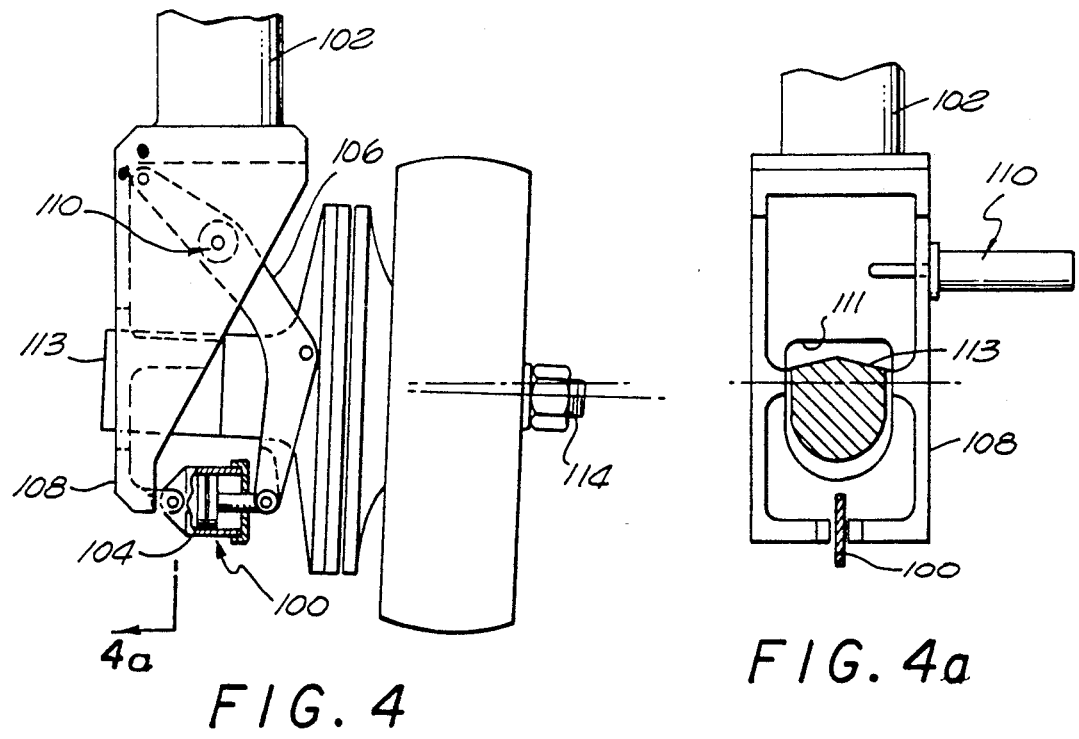
FIG. 4
FIG. 4a

1

POTENTIAL ENERGY OR WEIGHT-OPERATED WHEEL BRAKES

BACKGROUND OF THE INVENTION

1. Field of the Invention

This invention relates to braking systems for vehicles and more particularly to a braking system which utilizes the vehicle weight as a force used to actuate the brake mechanism, without the need for pressurized elements.

2. Description of the Related Art

Hydraulic or pneumatic brakes which are typically used for vehicles can fail because of seal degradation, leakage or failure of other components due to the complexity of pressurized brakes. A number of special braking design methods have been proposed for increasing the reliability of braking systems or for providing emergency braking systems.

For example, U.S. Pat. No. 2,777,546, issued to C. S. Kelley, entitled "Airplane Brake Equipment", discloses a braking device for an aircraft in which the weight of the vehicle, expressed as wheel load, acts through a slideable central shaft having tooling symmetrically disposed about the shaft which are pivotally attached to the shaft at their upper ends and bell cranks at their lower ends which are also symmetrically disposed about the shaft. The link transmits the wheel load to the bell crank elbow pivot, which causes the bell crank to pivot about its upper/outer pivot which is attached to vehicle structure, causing the lower end of the bell crank, which is pivotally connected to a conventional brake shoe, to rotate, thereby causing braking.

This relatively complex mechanism would, without further provision, apply the brake force at touchdown, which is undesirable until after landing and stabilization of touchdown perturbations. Also, the brakes would remain on, making take off impossible. Therefore, in view of this, Kelley includes a hydraulic or pneumatic piston/cylinder at the slideable interface, together with associated plumbing and valving for pressurization and venting, in order to brake at touchdown and to allow brake release for takeoff. This requires the pilot to manually pressurize the system before landing, vent for braking, and repressurize for takeoff.

In view of the above, there is a need for a simpler, more efficient and reliable braking device for operational or emergency use that utilizes vehicle weight by translating the weight into braking force without a need for pressurized mechanisms.

SUMMARY OF THE INVENTION

The present invention is a braking device for a vehicle utilizing a plurality of wheels that permit motion relative to a substantially horizontal surface. It is particularly adaptable for use with aircraft landing gear as either an operational or emergency brake system. It can be used with one or more wheels at each of the two main landing gear struts and the nose wheel. Brake force modulation may be added, if desired.

In its broadest aspects, the present invention includes support means for supporting at least one of the wheels. An orthogonal coordinate system is defined where x is the longitudinal axis of the vehicle and is parallel to the direction of vehicle motion; y is perpendicular to the x-axis, and in the horizontal plane, and z is the vertical axis. The support means includes axle means disposed substantially parallel to the y-axis for supporting at least one wheel. Means are provided for rotatably engaging the axle means with the wheel. The supports means includes a rotary friction brake assembly and attachment means for pivotally attaching the stator of the brake assembly to the main structure. The attachment means includes at least one link element disposed substantially in the y-z plane. The link element has a first end pivotally mounted to the main structure and a stator attaching portion pivotally mounted to the stator. Restraint/release means is connected to the link element for securing the link element in a desired angular position so as to preclude braking by preventing sliding of the stator along the axle. The restraint/release means when released, allows the link element to pivot so as to allow sliding of the stator along the axle, bringing the stator and rotor together, thereby providing braking.

BRIEF DESCRIPTION OF THE DRAWINGS

FIG. 3 is a view looking aft at a third embodiment of the present invention, having a double stub axle and a short stroke linear actuator for brake force control.

FIG. 3a is a partial side view of the FIG. 3 embodiment, illustrating one of the linked elements and its pivotable attachment to one of the two brake stators and to one end of the linear actuator.

FIG. 4 is a view looking aft at a fourth embodiment of the present invention which includes the linear actuator of the FIG. 3 embodiment, applied to a single stub axle.

FIG. 4a is a partial side view of the FIG. 4 embodiment, showing the main structure, its pivotable attachment to the single diagonal link (the link being deleted for clarity), the single stub axle and one end of the linear actuator.

The same elements or parts throughout the figures are designated by the same reference characters.

DETAILED DESCRIPTION OF THE PREFERRED EMBODIMENTS

Figure 1:
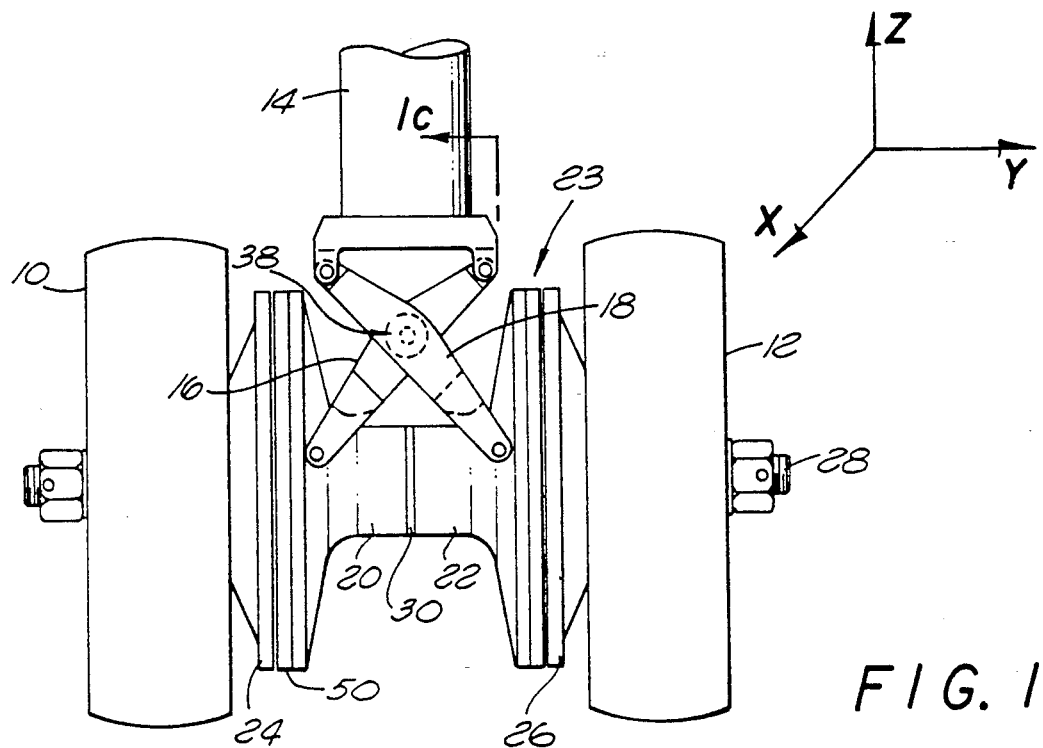
FIG. 1 is a view looking aft at a preferred embodiment of the present invention, having a double stub axle with a crossed pair of link elements which are pinned at the crossover point by a pin puller latch assembly, the embodiment illustrating the no-brake position.

Referring to the drawings and the characters of reference marked thereon, FIG. 1 illustrates a preferred embodiment of the present invention. In this Figure, use of the present invention in conjunction with a typical aircraft landing gear is described for illustrative purposes; however, the principles of the present invention are not limited to aircraft applications and may be employed for any vehicle using wheels for motion relative to a surface, or for braking rotative inertial loads such as flywheels, or, still more generally, for braking the rotation of any shaft.

Typically, aircraft landing gear includes dual wheels 10, 12 at each of the two main struts (only one strut 14 being illustrated in FIG. 1) and frequently at the nose gear. In accordance with the present invention, two crossed link elements 16, 18 are pivotally attached at their upper ends to the lower end of strut 14. The lower ends of the link elements 16, 18 are pivotally attached to the hollow shaft portion of the disk brake stators 20 and 22. The stators 20, 22 and associated rotors 24, 26 are mounted on axle means 28, which also supports wheels 10, 12.

Figure 1A:
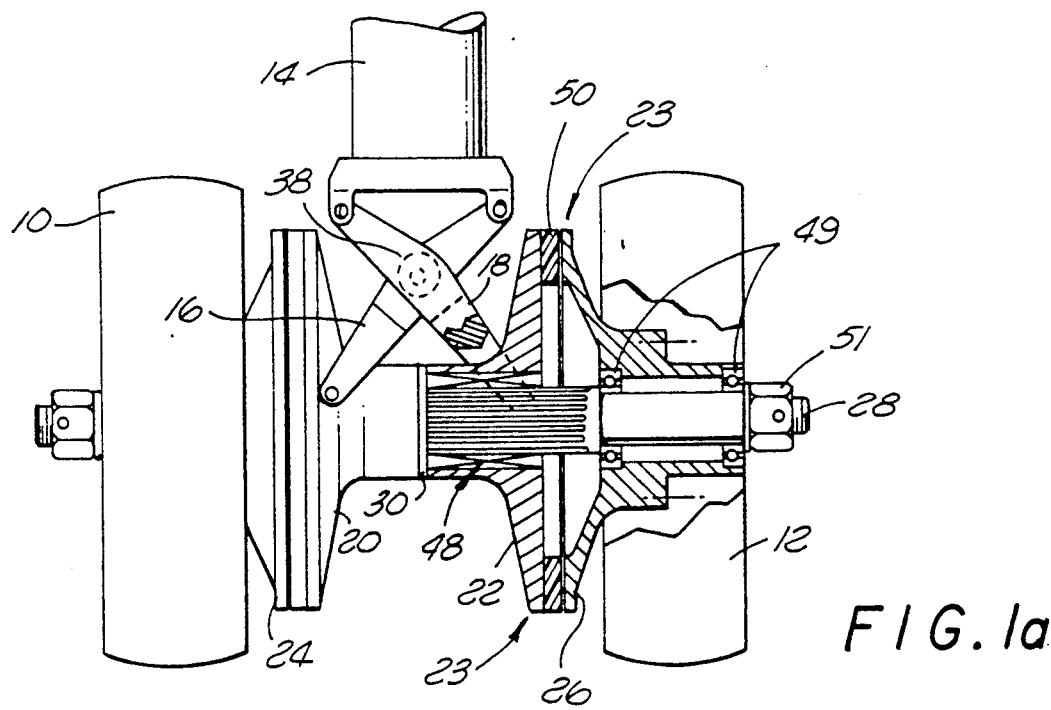
FIG. 1a illustrates the embodiment of FIG. 1, in partial cross section.

Axle means 28 is disposed substantially parallel to the y-axis, where the y-axis is defined in an x, y, z orthogonal coordinate system. The x-axis defines the longitudinal axis of the aircraft and, concomitantly, the direction of motion. The y-axis is the horizontal axis and the z-axis is the vertical axis, as shown in the figures. The axle means 28 preferably includes an integral collar 30 (best seen in FIG. 1a) which abuts the stators in a no-brake position, thereby insuring precise axial positioning of the stators 20, 22 relative to the rotors 24, 26.

Figure 1B:
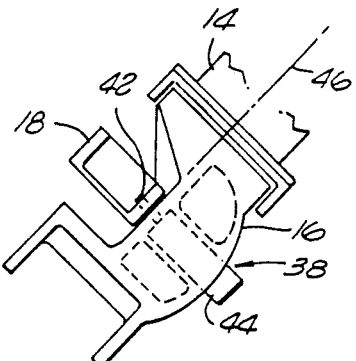
FIG. 1b is a view along line 1b—1b of FIG. 1, illustrating the pin puller latch assembly.
Figure 1C:
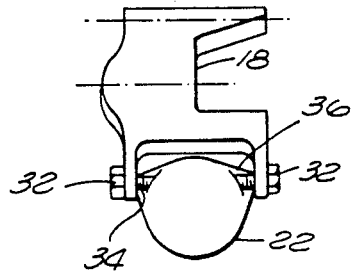
FIG. 1c is a partial side view of the FIG. 1 embodiment, taken along line 1c—1c of FIG. 1, illustrating the lower attachment of one of the link elements to a disk brake stator.

Referring now to FIG. 1c, it is seen that the lower ends of the two link elements 16, 18 are pivotally attached to the hollow shaft portion of the disk brake stators 20, 22, of a rotary friction disk brake assembly 23 by two short, threaded shoulder bolts 32. Mating threads 34 are located in bosses 36 on the hollow shaft portion 22. The shoulder bolts 32 thus provide pivot means without penetration of the hollow interior of the stator shaft portion 22.

Referring now to FIG. 1b, the restraint/release means or pin puller latch assembly, designated generally as 38, is connected to the link elements 16, 18 for securing the link elements at the crossover location. The restraint/release means 38 can be, for example, a conventional single use pyrotechnic pin puller assembly or a resettable, reusable pressurized fluid or electromechanical linear actuator. In the pin puller assembly 38 illustrated in FIG. 1b a shear pin 42 extends from a cylinder 44 fixedly attached to link element 16 into link element 18. The crossed link elements 16, 18 are curved as shown in FIGS. 1b and 1c in order to position the vertical shear plane 46 such that it includes the vertical centerline of strut 14, thereby minimizing strut bending.

The disk brake stators 20, 22 are slideably engaged with axle means 28 by use of a conventional recirculating ball spline assembly (i.e. slideable engagement means) 48 which mates with longitudinal splines in the axle 28, thereby preventing the axle 28 from rotating relatiive to the stators.

Alternatively, manufacturing costs may be reduced by use of a recirculating ball assembly that does not use splines (not shown) which is also commercially available. Such an assembly allows both axial sliding and rotation but at the expense of reduced load capacity. It also permits the axle to rotate, permitting the wheel to be clamped to the axle, further reducing cost, but at the expense of reduced axle fatigue life. With the unsplined assembly, the wheels are rotatably engaged with the axle by conventional anti-friction bearings and mounting techniques well understood to those skilled in the art.

In a second alternative (not shown) to the ball spline assembly illustrated, neither longitudinal splines nor recirculating balls are required. A slip (close diametral) fit is maintained by anti-friction coatings or sleeve bushings.

Conventional anti-friction rolling element bearings 49 are provided between the wheels and the axle. The entire assembly is secured by nuts 51.

In FIGS. 1-1c, the braking device is in the no-brake position, a small gap existing between brake pad 50 and rotor 26. In this position, precise axial positioning of the stator 22 relative to the rotor 26 is maintained by the flange (i.e. collar) 30 which is integral with the axle 28. After touchdown and roll out stabilization, a button (not shown) accessible to the pilot is activated causing the shear pin 42 to be retracted from its engagement with link element 18. The weight of the aircraft causes the link elements 16, 18 to pivot. The resultant sliding of the stators 20, 22 along the axle 28 results in contact between the pads 50 and their respective rotors 24, 26. The force between the pad 50 and the rotor 26 is proportional to the axle or column load in the diagonal link element. The column load is also a function of the angle between the column axis of the link and the airplane strut centerline.

Figure 2:
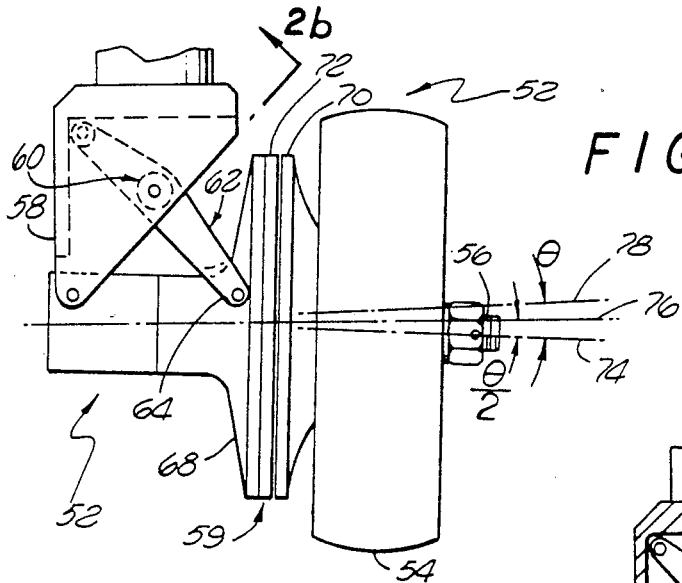
FIG. 2 is a view looking aft of a second embodiment of the present invention having a single stub axle with a single diagonal link element, pinned at or near midlength by a retractable shear pin to the landing gear structure.
Figure 2A:
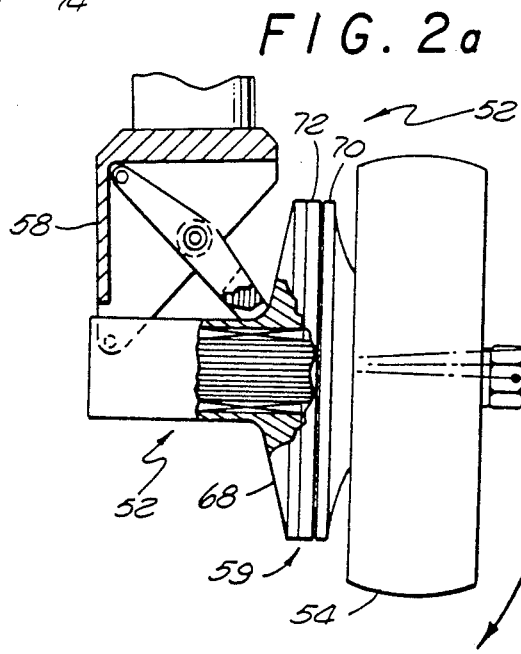
FIG. 2a illustrates the embodiment of FIG. 2 in partial cross section.

FIG. 2 illustrates a second embodiment of the present invention, designated generally as 52, using a single wheel 54 and a single stub axle 56 at the landing gear strut assembly 58. Except as noted in the description which follows, the right portion of FIGS. 2 and 2a have parts corresponding to those found in the corresponding portion of FIGS. 1 and 1a, including the wheel 54, disk brake assembly 59, anti-friction bearings and a pin puller assembly 60. However, a single diagonal link element 62 is utilized.

Figure 2B:
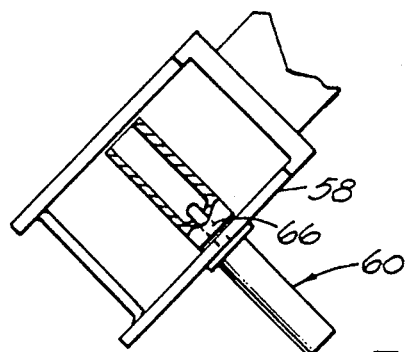
FIG. 2b is a view taken along line 2b—2b of FIG. 2, illustrating the single diagonal link element of the FIG. 2 embodiment and its attachment to the gear strut.

As in the case of the double stub axle embodiment of FIGS. 1-1c, the single stub axle 56 has one end (i.e. a first terminal portion) pivotally attached to the strut 58 and the other end (i.e., the stator attaching portion 64 or second terminal portion) pivotally attached to the stator. However, in this embodiment the pin puller assembly 60 connects the link element 62 to the strut assembly 58. Because of the cantilever nature of this single wheel embodiment, the stub axle 56 will tilt about its attachment to strut 58 after pin 66 (see FIG. 2b) is retracted and disk brake stator 68 begins to slide toward disk brake rotor 70. The total slide is that required to make contact between the two brake elements 70, 72, plus that resulting from brake pad 72 wear. This total travel is small but is directly related to axle 56 tilt in the vertical plane. Undesirable effects on the tire can be reduced by pinning the axle 56 at a position, designated 74, at a downward tilt angle, $\theta/2$, from a position 76 measured from the ground. When the pin is released, and the vehicle comes to rest, the axle 56 is ultimately located at position 78 at an upward tilt equal to the initial downward tilt i.e. $\theta/2$.

Referring now to FIG. 3, a third embodiment of the present invention, designated generally as 79, is illustrated which includes a control means for modulating the braking force.

The third embodiment, like the first embodiment, includes wheels 80, disk brake assemblies 82, anti-friction bearings, axle 84, and a pin puller latch assembly 86. However, the two crossed link elements 88, 90 are extended downward from their pivot points at the disk brake stators 92 and they include additional pivot means 94, 96 and control means 98. Control means 98 preferably comprises a linear actuator. The central axis of the linear actuator is parallel to axle 84. While the linear actuator 98 could be electromechanical, the pressurized piston/cylinder assembly 98 illustrated tends to minimize package volume.

This embodiment utilizes vehicle weight as the only source for conversion to braking force. For this, only the rod side of the piston need be pressurized and vented to vary the brake force. This produces the actuator tension force necessary to oppose the brake force in the slideable disk brake stator 92. The added length of the link elements 88, 90 allows the sides of these elements to curve toward each other and merge underneath the brake stators 92 where the actuator 98 attaches as shown in FIG. 3a.

If the pressure within the rod side is controllable, the braking force can be reduced or increased, but not above that due to vehicle weight. If the pressure on both sides of the piston head are controllable, there is an additional capability of increasing the brake force above that available from the vehicle weight alone.

FIG. 4 illustrates a fourth embodiment of the present invention, designated generally as 100, which provides a variable brake force means for a single wheel landing gear strut 102. This embodiment includes a linear actuator 104 such as that illustrated in the third embodiment (FIG. 3) and the single wheel per strut illustrated in the second embodiment (FIG. 2).

The single diagonal link element 106 in FIG. 4 is identical to the corresponding link element 90 illustrated in FIG. 3, which provides pivoting for one end of the actuator 104. Provision for attachment of the other end of the actuator 104 is provided by a gear strut extension 108 which extends downward to a location so that the linear actuator 104 can be attached thereto substantially parallel to the axis of the axle 114. Link element 106 is attached to strut 102 by a pin puller latch assembly 110 as illustrated in the previous embodiments. Cutaway portion 111 of the gear strut extension accommodates the end of the single stub axle 113.

Obviously, other modifications and variations of the present invention are possible in light of the above teachings. For example, it is therefore, to be understood that, within the scope of the appended claims, the invention may be practiced otherwise than as specifically described.

What is claimed and desired to be secured by Letters Patent of the United States is:

1. A braking device for a vehicle which device is actuated by vehicle weight or load without the need for pressurized elements, the vehicle having a main structure with a longitudinal axis, x, defining a direction of vehicle motion, a horizontal axis, y, which is perpendicular to the x-axis, and a vertical axis, z, the axes x, y, and z defining an orthogonal coordinate system, said vehicle utilizing a plurality of wheels for motion relative to a surface, each wheel having an axis of rotation, the braking device comprising:
   support means for supporting at least one of said wheels to said main structure of said vehicle, said support means including:
   (a) axle means disposed substantially parallel to said y-axis for supporting said at least one supported wheel;
   (b) means for rotatably engaging said axle means with at least one wheel;
   (c) a rotary friction brake assembly having a least one stator slideably engaged on said axle means, at least one rotor fixedly mounted to said at least one supported wheel, and at least one brake pad disposed between said stator and said rotor; and
   (d) attachment means for pivotally attaching said stator to said main structure, said attachment means having,
      (i) at least one link element disposed substantially in the y-z plane formed by an intersection of the y axis and the z axis, said link element having a first end pivotally mounted to said main structure, and a stator attaching portion pivotally mounted to said stator, a column load in said link element being a function of said vehicle weight or load; and,
      (ii) restraint/release means connected to said link element for securing said link element in a desired angular position so as to preclude braking by preventing sliding of the stator along the axle means, said restraint/release means for releasing the link element to another desired angular position so as to allow sliding of the stator along the axle means until the stator contacts the rotor, thereby providing a braking force by said vehicle weight or load.

2. The braking device of claim 1 wherein said stator is slideably engaged within a slip diametral fit between an inner surface of said stator and an outer surface of said axle means.

3. The braking device of claim 2 wherein said stator is slideably engaged by a recirculating ball assembly disposed between the inner surface of said stator and the outer surface of said axle means, said recirculating ball assembly allowing both axial sliding of said stator and rotation of said axle means.

4. The braking device of claim 2 wherein said stator is slideably engaged by a recirculating ball assembly disposed between the inner surface of said stator and the outer surface of said axle means for allowing relative axial sliding but preventing rotation of said axle means with respect to said stator.

5. The braking device of claim 1 wherein said axle means includes an integral collar which abuts said stator in a no-brake position, thereby insuring precise axial positioning of said stator relative to said rotor.

6. The braking device of claim 1 wherein said rotary friction brake assembly includes a disk brake assembly.

7. The braking device of claim 1 wherein said means for rotatably engaging said at least one wheel with said axle means includes anti-friction rolling element bearings, said wheel being restrained from axial sliding on said axle means.

8. The braking device of claim 1 wherein said axle means includes a single stub axle.

9. The braking device of claim 8 wherein said single stub axle includes a first terminal portion pivotally mounted to said main structure, and a second terminal portion slideably engaged in said stator.

10. The braking device of claim 9 wherein said stator attaching portion of said link element is a second end of said link element.

11. The braking device of claim 9 wherein said single stub axle slopes downward from first terminal portion of said axle by a small angle with the y-axis, said braking device being restrained in a no-brake position by said restraint/release means, said small angle being equal to a approximately one-half the total angular travel occurring when said braking device is released for braking to when said vehicle stops.

12. The braking device of claim 10 wherein said attachment means includes a single diagonal link element fixedly latched to said main structure by said restraint/release means at a location between said first and second ends of said link element.

13. The braking device of claim 12 wherein said restraint/release means includes a single-use shear pin retractor.

14. The braking device of claim 11 wherein said restraint/release means includes a resettable, reusable pin puller.

15. The braking device of claim 1 wherein said rotary friction brake assembly includes two said stators and said axle means includes a unitary double stub axle having first and second symmetrically disposed terminal portions, said first terminal portion for slideably engaging a first stator and said second terminal portion for slideably engaging a second stator.

16. The braking device of claim 15, wherein said attachment means for pivotally attaching said first and second stators to said main structure includes two link elements disposed diagonally substantially in said y-z plane, each of said link elements having a first end pivotally mounted to said main structure, a second end of a first of said link elements being pivotally mounted to said first stator and a second end of said link elements being pivotally mounted to said second stator.

17. The braking device of claim 16 wherein said diagonally disposed link elements are crossed, with respect to each other, so as to form an x-shape.

18. The braking device of claim 17 wherein said restraint/release means is positioned at a location where said diagonally disposed link elements are crossed.

19. The braking device of claim 18 wherein said restraint/release means includes a single-use shear pin retractor.

20. The braking device of claim 18 wherein said restraint/release means includes a resettable, reusable pin puller.

21. The braking device of claim 18 wherein each stator attaching portion of each said link element is a second end of each said link element.

22. The braking device of claim 1 wherein said restraint/release means includes reusable control means for modulating the braking force.

23. The braking device of claim 22 wherein said control means is a linear actuator.

24. The braking device of claim 23 wherein said linear actuator is disposed at a second end of said at least one link element.

25. The braking device of claim 24 wherein said linear actuator is positioned under said at least one stator.

26. The braking device of claim 24 wherein said axle means is a double stub axle.

27. The braking device of claim 24 wherein said linear actuator includes a piston having a rod side, pressure within said rod side being controllable, thereby allowing the braking force to be reduced or increased.

28. The braking device of claim 24 wherein said linear actuator includes a piston head, pressure on both sides of the piston head being controllable, thereby providing a capability of increasing the braking force above that available from the vehicle weight alone.

* * * * *